United States Patent
Stronski

(10) Patent No.: US 6,866,307 B1
(45) Date of Patent: Mar. 15, 2005

(54) APPARATUS FOR CONNECTING FLUID CONDUITS

(76) Inventor: Dale Stronski, 1276 Runciman Crescent, Regina, SK (CA), S4X 3A9

( * ) Notice: Subject to any disclaimer, the term of this patent is extended or adjusted under 35 U.S.C. 154(b) by 0 days.

(21) Appl. No.: 10/686,152

(22) Filed: Oct. 15, 2003

(30) Foreign Application Priority Data

Sep. 3, 2003 (CA) ............................................. 2439323

(51) Int. Cl.[7] ................................................ F16L 23/00

(52) U.S. Cl. ...................................... 285/368; 285/364

(58) Field of Search ................................. 285/364, 368, 285/412

(56) References Cited

U.S. PATENT DOCUMENTS

| | | | |
|---|---|---|---|
| 2,175,550 A | * 10/1939 | Neebe ......................... | 285/368 |
| 2,328,898 A | * 9/1943 | Goff et al. ................... | 285/368 |
| 2,491,004 A | 12/1949 | Graham | |
| 2,550,536 A | * 4/1951 | Delano, Jr. et al. ......... | 285/412 |
| 2,927,805 A | 3/1960 | Faccou | |
| 3,057,646 A | 10/1962 | Brumagim | |
| 5,338,075 A | * 8/1994 | Albrecht ..................... | 285/368 |

FOREIGN PATENT DOCUMENTS

FR 2563316 * 10/1985 ................. 285/368

* cited by examiner

Primary Examiner—David Bochna
(74) Attorney, Agent, or Firm—John F. Salazar; Middleton Reutlinger

(57) ABSTRACT

An apparatus for connecting first and second conduits to carry a fluid under pressure comprises a first face attached around an open end of the first conduit and a pocket face attached around an open end of the second conduit and defining a pocket. The first face is fastened to the pocket face such that the first face is substantially perpendicular to walls of the pocket and adjacent to an open end of the pocket. A gasket member is slidingly engaged in the pocket and defines a passageway through a central portion thereof. The gasket member has a gasket face adjacent and substantially parallel to the first face and an opposite pressure face inside the pocket. A bias element exert a bias force on the gasket member toward the first face and a pocket seal seals an outer periphery of the gasket member to the walls of the pocket. A main gasket is located between the gasket face of the gasket member and the first face, and the pressure face of the gasket member is exposed to fluid carried by the conduits and has an area that is greater than an area of the gasket face between the main gasket and the passageway through the gasket member. The higher the pressure inside the conduits the greater the force that is exerted on the main gasket, sealing the connection.

9 Claims, 3 Drawing Sheets

1

APPARATUS FOR CONNECTING FLUID CONDUITS

This application claims priority to and benefit of, currently Canadian Patent Application Serial Number 2,439,323, filed on Sep. 3, 2003.

TECHNICAL FIELD

This invention is in the field of fluid conduits such as are used to carry liquids and gases, and in particular an apparatus for connecting such conduits together or to various fittings in a conduit network.

BACKGROUND OF THE INVENTION

Sections of fluid conduit must be connected together, or to other fittings in a conduit network to carry gases and liquids without leaking from the network. The fluid pressure varies from low pressure lines, such as sewage lines where the pressure is essentially atmospheric pressure, to higher pressure water lines and the like, up to very high pressure industrial lines where the pressure is 10,000 pounds per square inch (psi) or more.

Conventional conduit connections are made using a gasket that is essentially clamped and squeezed between hollow members attached to each conduit. The clamping force is exerted by bolts in a typical flange connection, by a threaded configuration on a typical pipe union, and like apparatuses.

For example in a typical flange connection, conventional gaskets are made from a material that is softer than the flange material, typically metal, plastic, rubber, or the like. Sealing of the connection is accomplished by clamping the flanges very tightly together so that the gasket is squashed between the two flanges. Typically the clamping force is provided by several bolts through corresponding holes around the flanges. To ensure proper sealing the bolts must be tightened evenly to a high torque. The flanges must be strong enough to resist distortion under the clamping forces, and as a result such flanges are commonly heavy, costly, and cumbersome, especially for high pressure conduits.

Similarly in a pipe union the threaded members are tightened to squeeze the sealing faces. In some unions of this type a gasket is used between the faces, while in others no gasket is present and the metal faces alone provide the seal when squeezed together.

Conduit networks can comprise a large number of connections. Significant longitudinal forces are exerted on the conduits when the conventional connections are tightened to exert the required clamping force. These forces are transferred through the conduit network from each such connection, causing stress on the entire network. The network must be designed to accommodate these forces, and careful installation is required to avoid excessive stress and resulting failure of components.

A prior art conduit coupling disclosed in U.S. Pat. No. 2,491,004 to Graham uses the pressure inside the conduit to force a gasket into engagement with a housing to seal a pipe coupling.

In some applications it is desired to have one conduit section or fitting swivel or rotate with respect to the next. It is known to use springs in such applications to urge a stationary seal against another rotating seal with sufficient force to prevent leakage between the two. Such swivel couplings are disclosed for example in U.S. Pat. No. 2,927,805 to Faccou, and 3,057,646 to Brumagin.

SUMMARY OF THE INVENTION

It is an object of the present invention to provide an apparatus for connecting conduits together, or to other conduit network components that overcomes disadvantages of the prior art connections. It is a further object of the present invention to provide such an apparatus that requires reduced clamping forces to connect the conduits together. It is a further object of the present invention to provide such an apparatus that reduces longitudinal forces exerted on connected conduits.

It is a further object of the present invention to provide such an apparatus that uses the pressure of fluid inside the conduits to exert a sealing force on a gasket sealing the connection between the conduits.

The invention provides, in one embodiment, apparatus for connecting first and second conduits to carry a fluid under pressure comprising a first face attached around an open end of the first conduit; a pocket face attached around an open end of the second conduit and defining a pocket; wherein the first face is fastened to the pocket face such that the first face is substantially perpendicular to walls of the pocket and adjacent to an open end of the pocket; a gasket member slidingly engaged in the pocket and defining a passageway through a central portion thereof, the gasket member having a gasket face adjacent and substantially parallel to the first face and an opposite pressure face inside the pocket; at least one bias element exerting a bias force on the gasket member toward the first face; a pocket seal sealing an outer periphery of the gasket member to the walls of the pocket; a main gasket between the gasket face of the gasket member and the first face; wherein the pressure face of the gasket member is exposed to fluid carried by the conduits and has an area that is greater than an area of the gasket face between the main gasket and the passageway through the gasket member.

In a second embodiment the invention provides an apparatus for connecting first and second conduits to carry a fluid under pressure comprising a first flange adapted for attachment to an open end of the first conduit; a pocket flange adapted for attachment to an open end of the second conduit and defining a pocket; wherein the first flange is adapted to be fastened to the pocket flange such that a face of the first flange is substantially perpendicular to walls of the pocket and adjacent to an open end of the pocket; a gasket member slidingly engaged in the pocket and defining a passageway through a central portion thereof, the gasket member having a gasket face adjacent and substantially parallel to the face of the first flange when the first flange is fastened to the pocket flange, and an opposite pressure face inside the pocket; at least one bias element operative to exert a bias force on the gasket member toward the open end of the pocket; a pocket seal operative to seal an outer periphery of the gasket member to the walls of the pocket; a main gasket adapted to be positioned between the gasket face of the gasket member and the face of the first flange; wherein the pressure face of the gasket member is exposed to fluid carried by the conduits and has an area that is greater than an area of the gasket face between the gasket and the passageway through the gasket member.

Once the conduits are pressurized with fluid, pressure inside the connection forces the main gasket on the face of the gasket member against the face of the first flange. Higher pressure exerts a greater force with the result that the seal is maintained for a wide range of pressures.

Installation is simplified since the high torque and even clamping force required by conventional connections is not required by the apparatus of the invention. Stress on the conduit network is reduced since clamping forces and the resulting longitudinal forces exerted on the conduits are reduced. Installation and design are simplified.

The invention also provides an apparatus for sealing two conventional flanges together, thus providing a substitute for a conventional soft gasket.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE PREFERRED EMBODIMENTS

Figure 1:
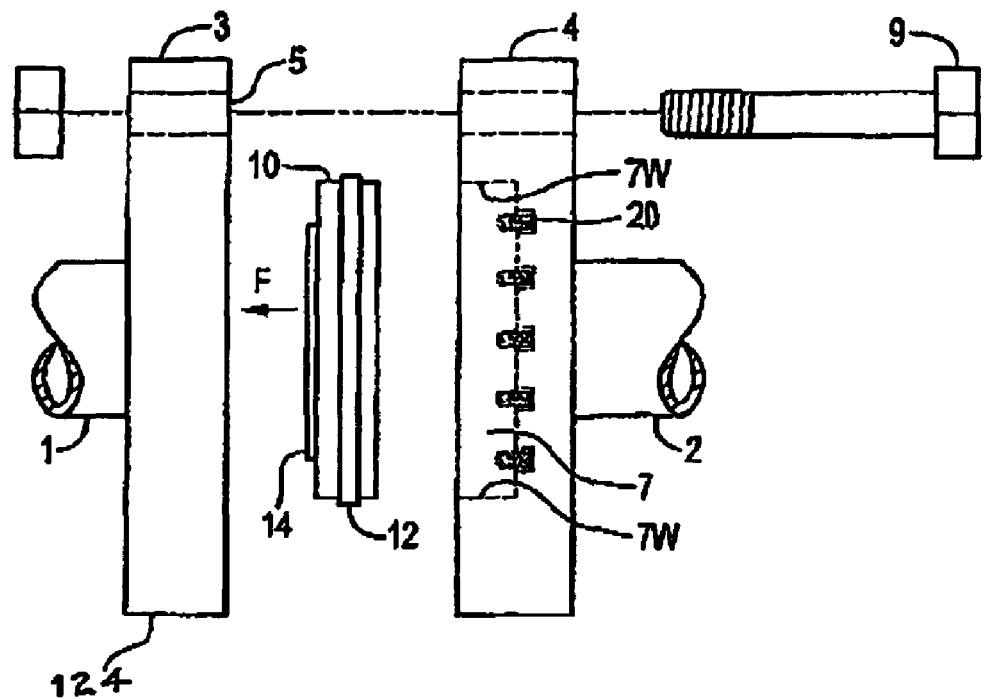
FIG. 1 is a side view of an apparatus of the invention joining two conduits.

FIG. 1 illustrates an apparatus of the present invention for connecting conduits 1 and 2 to carry a fluid under pressure. The apparatus comprises a first flange, illustrated as flat flange 3 with a flat face 5 attached around an open end of the first conduit 1. A pocket flange 4 is attached around an open end of the second conduit 2 and has a pocket face 11 that defines a pocket 7. The same connection can be made where one of the flanges 3, 4 is attached to a conduit that is incorporated in a T-fitting, an elbow, or any like component of a conduit network.

The first face 5 is adapted to be fastened to the pocket face 11 with bolts 9 or the like such that the first face is 5 substantially perpendicular to walls 7W of the pocket 7 and adjacent to an open end of the pocket 7. A threaded union, or similar known mechanism for holding the flanges together could be used as well. A gasket member 10 is slidingly engaged in the pocket 7 and defines a passageway through a central portion thereof to allow fluid to flow through the connection. The gasket member 10 has a gasket face 13 adjacent and substantially parallel to the first face 5 and the gasket member 10 has an opposite pressure face 15 inside the pocket 7.

Bias elements, illustrated as springs 20, exert a bias force on the gasket member 10 toward the first face 5. A pocket seal, illustrated as outer o-ring 12, seals the outer periphery of the gasket member 10 to the walls 7W of the pocket 7. A main gasket, illustrated as inner o-ring 14, lies between the gasket face 13 of the gasket member 10 and the first face 5.

Figure 2:
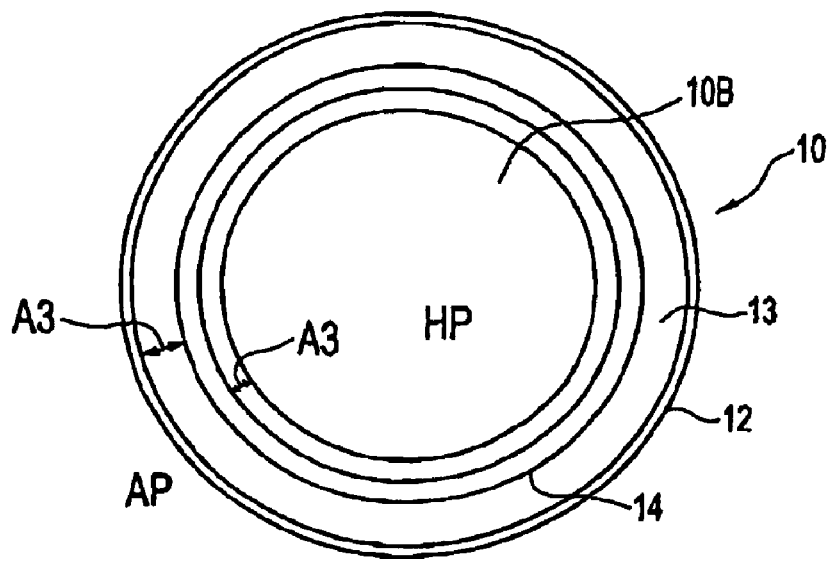
FIG. 2 is a top view of the gasket member of the apparatus of FIG. 1.
Figure 3:
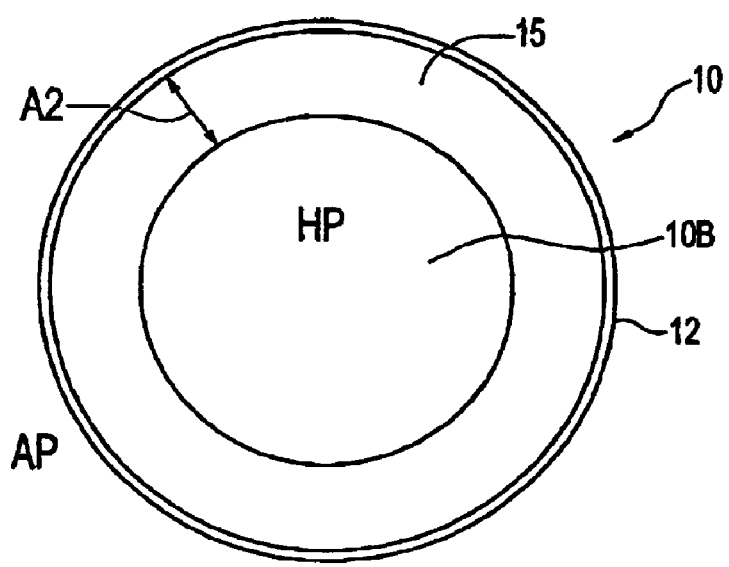
FIG. 3 is a bottom view of the gasket member.

Gasket member 10, as best seen in FIGS. 2 and 3, is an annular ring of metal, or a like hard material, with a groove around the periphery thereof to accommodate the outer o-ring 12, and a groove in gasket face 13 to accommodate the inner o-ring 14. The opposite pressure face 15 of the gasket member 10, illustrated in FIG. 3 is typically flat.

Flat flange 3 has a flat face 5 that bears against the inner o-ring 12. Pocket flange 4 defines a pocket 7 such that the gasket member 10 slides into the pocket 7 with the outer o-ring 12 sealing against the walls of the pocket 7. The flanges 3, 4 are clamped together with bolts 9.

Conventional gasket members are made from a material that is softer than the flange material, typically metal, plastic, rubber, or the like. Sealing of the connection is accomplished by tightening the bolts to a high torque so that the gasket is squashed between the two flanges. The bolts must also be tightened evenly to ensure proper sealing.

Sealing of the conduit connection of the invention does not depend on a high torque on the bolts 9 exerting a large clamping force. In fact the clamping force is not translated to the gasket member 10 at all, since the gasket member 10 slides in the pocket 7. The seal of the invention is accomplished initially with bias elements, illustrated as springs 20, pushing against the pressure face 15 of the gasket member 10 and causing the gasket member 10 to slide in the pocket 7 and thus force the inner o-ring 14 against the flat face 5 of the flat flange 3. The inner o-ring 14 seals against the flat face 5 of the flat flange 3, and the outer o-ring 12 seals against the walls of the pocket 7, thereby sealing the connection.

Figure 1A:
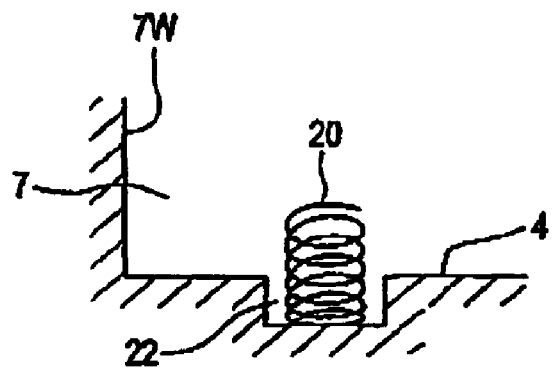
FIG. 1A is a schematic detail view of the spring bias elements.

FIG. 1A schematically illustrates the seating of a spring 20 in a recess 22 in the bottom of the pocket 7 in pocket flange 4. The bias force could also be provided by various other spring configurations, resilient pads, or similar bias elements as are known in the art.

During start up, the seal between inner o-ring 14 and flat face 5 is maintained by the springs 20. As the pressure in the conduits 1, 2 builds, that pressure exerts a correspondingly increasing force urging the gasket member 10 towards the flat face 5 of the flat flange 3, as described below.

Between the outer and inner O-rings 12, 14 on the inside of the seal, the pressure HP is that of the fluid inside the connected conduits 1, 2. Between the O-rings 12, 14 on the outside of the seal, the pressure is that of the atmosphere surrounding the connection AP, typically much lower than the pressure HP inside the conduits 1, 2. Thus the pressure face 15 of the gasket member 10 is exposed to fluid carried by the conduits 1,2 and has an area that is greater than an area of the gasket face 13 between the main gasket, inner o-ring 14, and the passageway 10B through the gasket member B.

Thus the pressure HP is being exerted on that portion of the gasket member 10 indicated by A1 on the gasket face 13, and A2 on the pressure face 15. This is the area between the O-rings 12, 14 that is inside the connection, extending from the inner ring 14 to the inside passageway 10B of the gasket member 10 (indicated by A1), along the walls of the passageway 10B, and across the opposite pressure face 15 to the outer edge of the gasket member 10 (indicated by A2) and then along the outer wall to the outer o-ring 12.

That portion of the gasket member 10 that is outside the seal is exposed to lower atmospheric pressure AP. The outside portion extends from the outer o-ring 14 along the wall to the gasket face 13 and along the gasket face 13 from the outer edge thereof to the inner o-ring 12 (indicated by A3).

The force exerted on the pressure face 15 of the gasket member 10 in direction F is a product of the total area A2 of the pressure face 15 times the pressure HP, plus whatever force is exerted by the springs 20. The force exerted on the gasket face 13 of the gasket member 10 in the direction opposite to F is a product of the area A1 of one portion of the gasket face 13 times the pressure HP, plus the area A3 of the other portion of the gasket face 13 times the atmospheric pressure AP.

The area A2 is approximately equal to the sum of the areas A1 and A3, discounting the width of the inner o-ring 14.

After assembly and prior to pressurizing the connection, the pressure inside HP and outside AP is the same, and the forces resulting from pressure are substantially equal. The force in direction F is then equal to the force of the springs 20. The force of the springs 20 is designed to provide sufficient force to maintain the seal via inner o-ring 14 between the gasket member 10 and the flat face 5 of the flat flange 3 during start up.

As the pressure HP builds, it can be seen that the force in direction F increases, since the higher pressure HP is being exerted on the areas A1 and A2. The area A2 is significantly greater than the area A1 resulting in a greater force in direction F, since the pressure AP on the area A3 remains constant. While the bolts 9 need not be highly torqued during installation, they must be strong enough to withstand the force F as the pressure HP builds to operating levels. The greater the pressure HP the greater the force F, thus maintaining the seal.

In some applications it may also be necessary to consider a situation where there is suction or vacuum on the conduits. Suction can sometimes develop when conduits are being drained for example. The pressure HP inside is then less than the atmospheric pressure AP. The strength of the springs 20 can be large enough to maintain the seal when the pressure HP is lower than the pressure AP, and the force exerted by the pressure AP on area A3 of the gasket face 13 added to the force exerted on area A1 by the pressure HP is greater than the opposite force exerted by the pressure HP on the area A2. The pressure forces would then tend to move the gasket face 13 and inner o-ring 14 away from the flat face 5 of the flat flange 3, thereby breaking the seal. Ensuring that the bias force exerted by the springs 20 is always larger than any such contemplated suction forces will ensure that the seal is maintained.

Depending on the pressures to be encountered in any particular application, the areas A1 and A3 can be adjusted by moving the inner o-ring 14.

Figure 4:
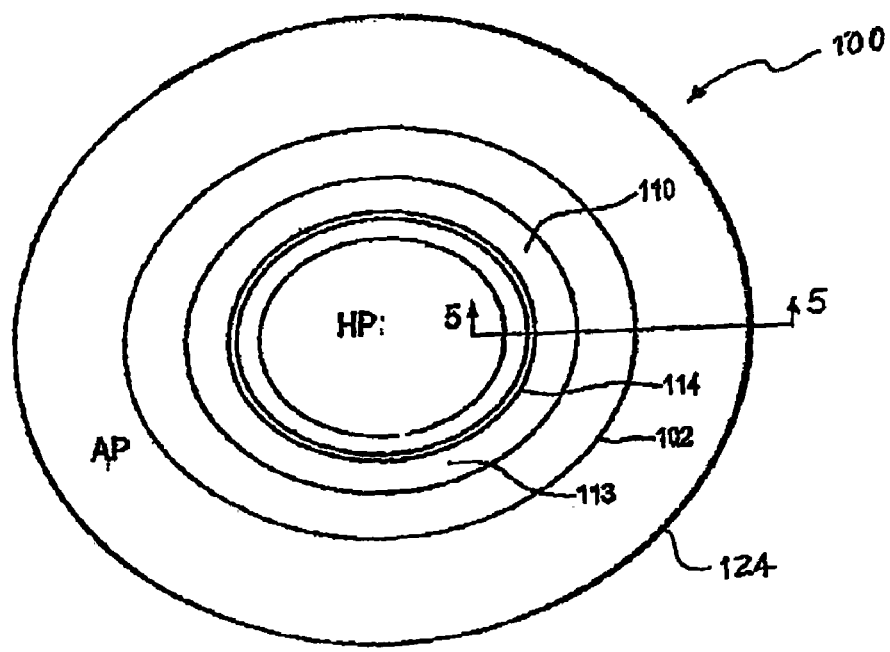
FIG. 4 is a top view of an alternate apparatus to provide a seal between two conventional flat flanges.
Figure 5:
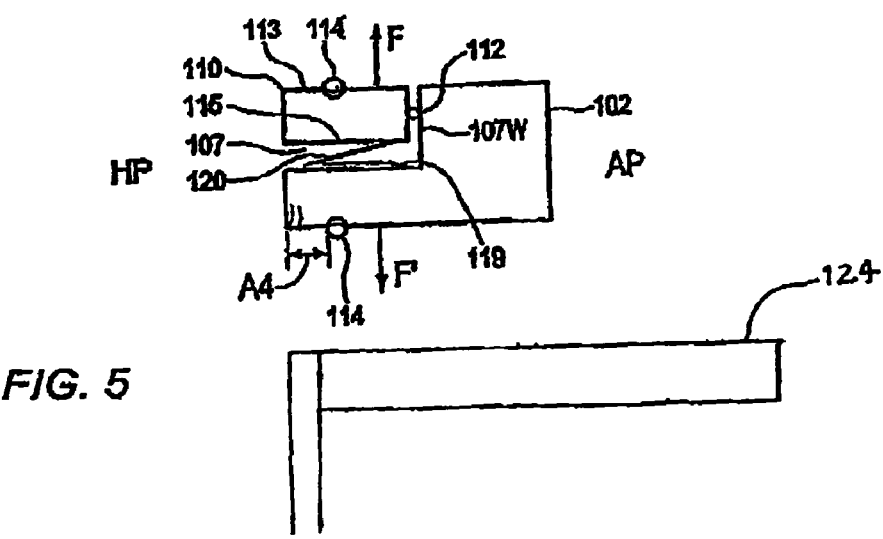
FIG. 5 is a schematic cross-section through line 5—5 in FIG. 4.

FIGS. 4 and 5 illustrate an alternate embodiment of the invention for use with a pair of conventional flat faced flanges 124 as shown in FIGS. 1, 4, and 5. The apparatus 100 provides a substitute for a conventional gasket. A pocket member 102 forms a pocket 107 that corresponds to the pocket 7 of the prior embodiment. A gasket member 110 slides in the pocket 107 and is sealed to the walls 107W of the pocket 107 by an outer o-ring 112. Inner O-rings 14 on the gasket member 110 and pocket member 102 provide the seal between the flat flanges. A bias element, illustrated as spring 120, exerts an initial force between the gasket member 110 and pocket member 102 so as to force them apart and exert equal and opposite forces F, F' on the flat flanges.

As above, when the pressure HP inside the connection rises above the atmospheric pressure AP, the force between the pressure face 1115 of the gasket member 110 and the pocket member 102 is greater than the opposite forces on the ring face 113 and the bottom area A4 of the pocket member 102, and a sealing force in directions F, F' is exerted to seal the inner O-rings 114 against the flat flanges. The pocket floor 119 between the walls 107W of the pocket 107 and the passageway through the pocket member 102 has an area that is greater than the area A4, and so the fluid pressure seals both the main and secondary gaskets illustrated as inner O-rings 114 against the corresponding flanges.

It would be readily apparent to someone skilled in the art of the present invention, that the present invention could be easily used as a thermal expansion joint. To make the present invention function as a thermal expansion joint, it could be modified by deepening the pocket 7, if a pocket flange 4 is to be used, or by deepening the pocket 107, if a pocket member 102 and conventional flanges are to be used. In addition to the deepening of the pocket 7 or pocket 107, the biasing elements would have to be altered. If the biasing elements comprised a spring 20, as shown in FIGS. 1 and 1a, or a spring 120, as shown in FIGS. 4 and 5, the stroke of the spring would have to be lengthened to accommodate the deepened pocket 7.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An apparatus for connecting first and second conduits to carry a fluid under pressure comprising:

a first face attached around an open end of the first conduit;

a pocket face attached around an open end of the second conduit and defining a pocket;

wherein the first face is fastened to the pocket face such that the first face is substantially perpendicular to walls of the pocket and adjacent to an open end of the pocket;

a gasket member slidingly engaged in the pocket and defining a passageway through a central portion thereof, the gasket member having a gasket face adjacent and substantially parallel to the first face and an opposite pressure face inside the pocket;

at least one bias element exerting a bias force on the gasket member toward the first face;

a pocket seal sealing an outer periphery of the gasket member to the walls of the pocket;

a main gasket between the gasket face of the gasket member and the first face;

wherein the pressure face of the gasket member is exposed to fluid carried by the conduits and an area of the gasket face between the main gasket and the passageway through the gasket member is exposed to fluid carried by the conduits; and wherein the pressure face of the gasket member has an area that is greater than the area of the gasket face between the main gasket and the passageway through the gasket member.

2. The apparatus of claim 1 wherein the first face is defined by a first flange attached to the end of the first conduit, and the pocket face is defined by a pocket flange attached to the end of the second conduit.

3. The apparatus of claim 1 wherein the main gasket comprises a main o-ring positioned in a groove on the gasket face of the gasket member.

4. The apparatus of claim 1 wherein the pocket seal comprises a pocket o-ring positioned in a groove around one of the outer periphery of the gasket member and the walls of the pocket.

5. The apparatus of claim 1 wherein the at least one bias element comprises at least one spring bearing against the pressure face of the gasket member at one end and against a bottom of the pocket at the other end.

6. The apparatus of claim 1 wherein the gasket member and pocket are cylindrical.

7. The apparatus of claim 1 wherein the pocket face comprises:
- a pocket member defining the pocket on one side thereof and an opposite gasket face adjacent to a face of a secondary flange member attached to the end of the second conduit, and wherein the pocket member defines a passageway through a central portion thereof, and includes a pocket floor between the walls of the pocket and the passageway through the pocket member; and
- a secondary gasket between the gasket face of the pocket member and the face of the secondary flange member;
- wherein the pocket floor has an area that is greater than an area of the first face of the pocket member between the secondary gasket and the passageway through the pocket member.

8. The apparatus of claim 7 wherein the pocket floor is substantially parallel to the face of the secondary flange member.

9. An apparatus for connecting first and second conduits to carry a fluid under pressure comprising:
- a first flange adapted for attachment to an open end of the first conduit;
- a pocket flange adapted for attachment to an open end of the second conduit and defining a pocket;
- wherein the first flange is adapted to be fastened to the pocket flange such that a face of the first flange is substantially perpendicular to walls of the pocket and adjacent to an open end of the pocket;
- a gasket member slidingly engaged in the pocket and defining a passageway through a central portion thereof, the gasket member having a gasket face adjacent and substantially parallel to the face of the first flange when the first flange is fastened to the pocket flange, and an opposite pressure face inside the pocket;
- at least one bias element operative to exert a bias force on the gasket member toward the open end of the pocket;
- a pocket seal operative to seal an outer periphery of the gasket member to the walls of the pocket;
- a main gasket adapted to be positioned between the gasket face of the gasket member and the face of the first flange;
- wherein the pressure face of the gasket member is exposed to fluid carried by the conduits and an area of the gasket face between the main gasket and the passageway through the gasket member is exposed to fluid carried by the conduits; and
- wherein the pressure face of the gasket member has an area that is greater than the area of the gasket face between the man gasket and the passageway through the gasket member.

* * * * *